United States Patent [19]
Sakamoto

[11] Patent Number: 5,041,034
[45] Date of Patent: Aug. 20, 1991

[54] GENERATING DEVICE FOR MARINE PROPULSION ENGINE

[75] Inventor: Osamu Sakamoto, Hamamatsu, Japan

[73] Assignee: Sanshin Kogyo Kabushiki Kaisha, Hamamatsu, Japan

[21] Appl. No.: 439,791

[22] Filed: Nov. 21, 1989

[30] Foreign Application Priority Data

Nov. 22, 1988 [JP] Japan .................... 63-293589

[51] Int. Cl.⁵ ............................. B63H 21/26
[52] U.S. Cl. .................. 440/76; 123/198 C; 123/533; 440/88
[58] Field of Search ......... 123/149 R, 198 C, 195 P, 123/179 D, 533, 599; 60/307; 440/76, 77, 88, 900, 6; 310/70 A

[56] References Cited

U.S. PATENT DOCUMENTS

| | | | |
|---|---|---|---|
| 3,230,698 | 1/1966 | Nettles | 440/6 |
| 3,517,504 | 6/1970 | Sakamoto | 60/307 |
| 4,674,462 | 6/1987 | Koch et al. | 123/533 |
| 4,689,025 | 8/1987 | Ferguson | 440/88 X |

FOREIGN PATENT DOCUMENTS 57491  3/1986  Japan ................... 440/77

Primary Examiner—Sherman D. Basinger
Attorney, Agent, or Firm—Ernest A. Beutler

[57] ABSTRACT

Several embodiments of internal combustion engines as applied to outboard motors incorporating a combined electrical generator and air compressor unit driven by the engine output shaft and having a single input shaft that drives both the electrical generator and the air compressor. The air compressor supplies compressed air for a fuel/air injection system and the combined unit is disposed in a recess formed by the engine so as to provide a compact assembly.

18 Claims, 5 Drawing Sheets

GENERATING DEVICE FOR MARINE PROPULSION ENGINE

BACKGROUND OF THE INVENTION

This invention relates to a generating device for a marine propulsion engine and more particularly to a generating device for supplying different forms of energy from an internal combustion engine for its operation and support.

As is well known, a number of external accessories are normally driven from the output shaft of an internal combustion engine for providing electrical energy and for moving a variety of fluids used by the engine or associated vehicle for its operation. In addition, a popular form of fuel injection system employs both pressurized fuel and pressurized air so that a pressurized fuel-/air charge is delivered to the engine for burning in the combustion chamber. The use of such injection systems requires an air compressor in addition to a device for pressurizing the fuel, thus further complicating the construction of the engine.

It is, therefore, a principal object of this invention to provide an improved arrangement for an internal combustion engine wherein an air compressor for a fuel/air injection system can be incorporated within another accessory driven by the engine so as to reduce the number of separate components driven from the engine.

The problems as aforedescribed are particularly acute with certain types of engine applications, for example, in outboard motors. As is well known, an outboard motor and particularly the powering internal combustion engine should be quite compact. However, the increasing number of accessories employed with outboard motors and the provision of such external driven mechanisms greatly complicates their construction and makes it difficult to maintain a compact arrangement.

It is, therefore, a still further object of this invention to provide an improved compact arrangement for generating external power from the internal combustion engine of an outboard motor.

It is a further object of this invention to provide an improved arrangement for driving a generator and air compressor from the output shaft of an internal combustion engine used in the powerhead of an outboard motor.

SUMMARY OF THE INVENTION

A first feature of this invention is adapted to be embodied in an internal combustion engine having an output shaft driven by the expanding gases from combustion within a combustion chamber of the engine. A fuel/air injection system is employed for injecting fuel and compressed air for combustion within the combustion chamber. In accordance with this feature of the invention, a generator unit having a single shaft is driven by the engine output shaft and includes a first accessory driven by the engine for generating power and which is driven by the single shaft and an air compressor device that is also driven by the single shaft for supplying pressurized air to the fuel/air injection system.

Another feature of the invention is adapted to be embodied in an outboard motor having a powerhead containing an internal combustion engine and a surrounding protective cowling. A generator has a single shaft that is driven from an output shaft of the engine and which drives a pair of auxiliaries for the engine.

DETAILED DESCRIPTION OF THE PREFERRED EMBODIMENTS OF THE INVENTION

Figure 1:
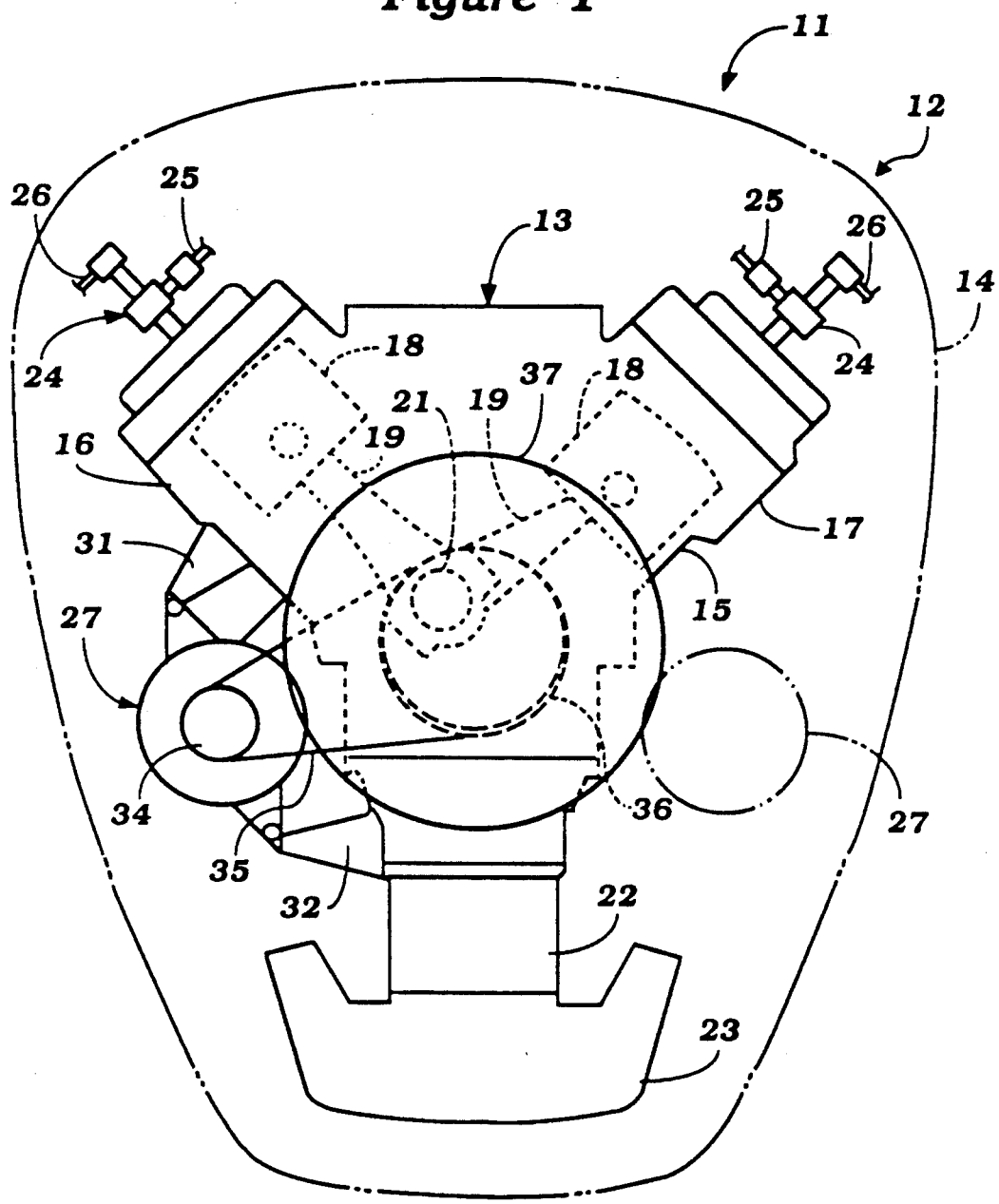
FIG. 1 is a top plan view of an outboard motor constructed in accordance with an embodiment of the invention, with a portion shown in phantom.
Figure 2:
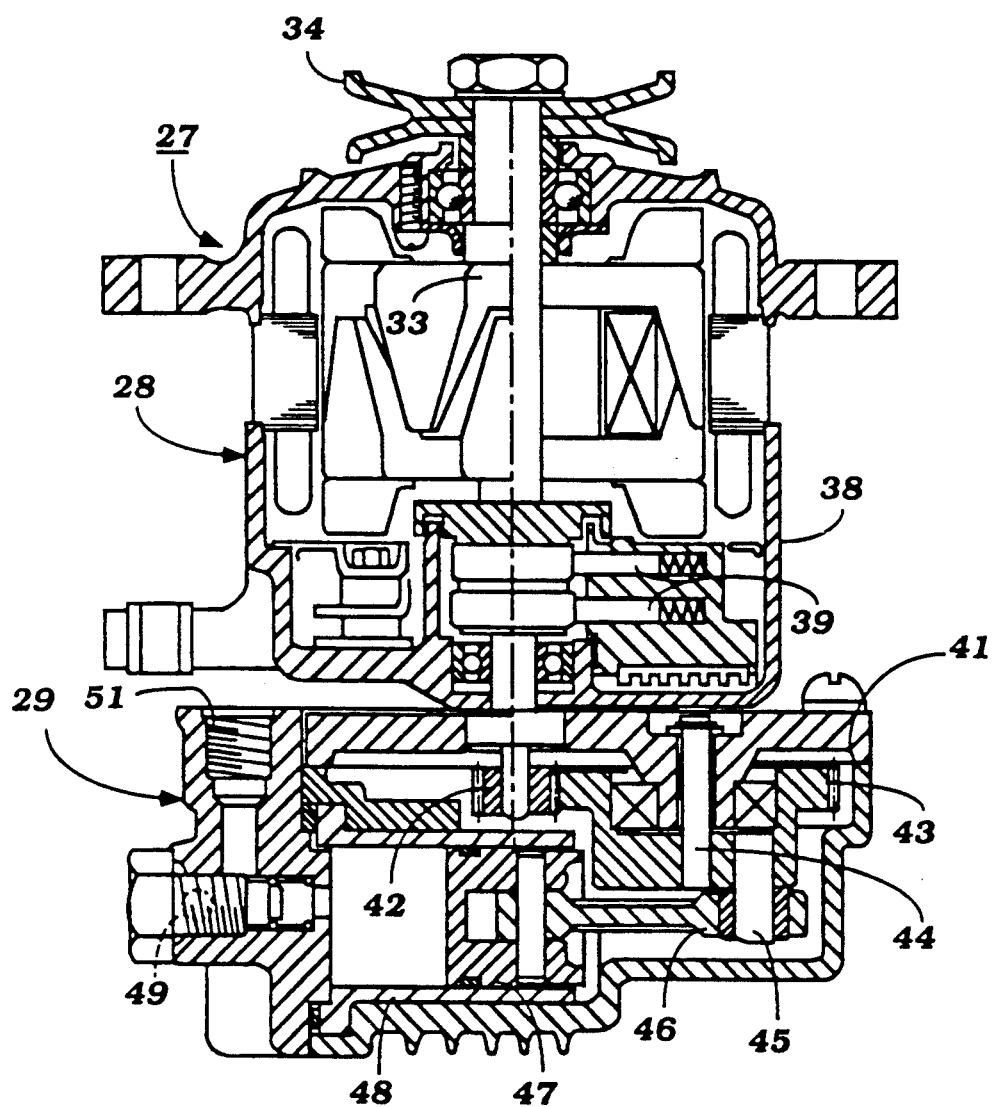
FIG. 2 is an enlarged cross-sectional view showing the auxiliary drive arrangement associated with the outboard motor and constructed in accordance with an embodiment of the invention.

Referring first to the embodiment of FIGS. 1 and 2 and initially primarily to FIG. 1, an outboard motor constructed in accordance with an embodiment of the invention is shown partially and is identified generally by the reference numeral 11. The invention relates primarily to the power head of the outboard motor, which power head is identified generally the reference numeral 12 and specifically to the associated internal combustion engine, indicated generally by the reference numeral 13 and certain auxiliaries driven by the engine. Therefore it is not believed necessary to show or describe the full construction of the outboard motor 11. It is to be understood, however, that the outboard motor 11 in addition to the powerhead 12 includes a drive shaft housing in which a drive shaft is journaled and which drives a propeller or propulsion unit of a lower unit, none of which components are illustrated for the aforedescribed reason.

The power head 12 is completed by a protective cowling 14 which is shown in phantom and which encircles the internal combustion engine 13. The cowling 14 may be of any known construction. However, because of the compact layout of the engine 13 and the auxiliaries drive by it, as will be described, the cowling 14 may be kept compact and in a pleasing configuration.

The engine 13 may be of any type but is, in the illustrated embodiment, depicted as being of the reciprocating two cycle crankcase compression type inasmuch as this is a typical type of engine employed in outboard motors. In the illustrated embodiment, the engine is of the V type and includes a cylinder block 15 having angularly related banks of cylinders 16 and 17 in which one or more cylinder bores are formed. Pistons 18 reciprocate in these respective cylinder bores and are connected by means of connecting rods 19 to drive a crankshaft 21 in a known manner. As is typical with outboard motor practice, the crankshaft 21 rotates about a vertically disposed axis.

The crankshaft 21 rotates within a crankcase chamber and a charge is delivered to this crankcase chamber through an induction system including air intake pipes 22 that draw air from within the protective cowling 14 through an air inlet device 23 which performs some air silencing function. The air inlet pipes 22 each deliver a charge to the individual sealed chambers of the crankcase each associated with a respective one of the cylinder bores through an intake manifold embodying reed type check valves.

In the illustrated embodiment, the engine 13 is provided with an injection device for direct injection of fuel and air under pressure into each combustion chamber of the engine, such injection devices being indicated generally by the reference numeral 24. The injection devices 24 may be of any known type and are supplied with fuel under pressure through a fuel supply line 25 from any suitable fuel supply source. In addition, air is supplied to the injection devices 24 from air inlet pipes 26. An air compressor, of the type to be described, supplies air to the air inlet pipes 26 of the fuel injectors 24.

With the V configuration of the cylinder banks 16 and 17 it should be noted that the construction shown in FIGS. 1 and 2 is of the type wherein the air inlet pipes 22 extend generally in a vertical plane and thus with the cylinder banks 16 and 17 define a Y shape in the plan view. Normally there will be one inlet pipe 22 for each crankcase chamber. As a result, this provides a recessed area between each cylinder bank 16 and 17 and the inlet pipes 22 which is normally unoccupied.

In accordance with the invention, an auxiliary generator mechanism, indicated generally by the reference numeral 27 is provided in this recessed area. The auxiliary generator mechanism 27 is comprised of an electrical generator 28 and an air compressor 29 (FIG. 2). The auxiliary generator mechanism 27 is mounted on a pair of bosses 31 and 32 formed on this side of the engine and has a generally vertically extending single drive shaft 33 that rotates about a vertically extending axis that is parallel to the axis of rotation of the crankshaft 21. A pulley sheave 34 is affixed to the upper end of the drive shaft 33 and is driven by a belt 35 which is, in turn, driven from a pulley sheave 36 that is mounted on the upper end of the crankshaft 21 and which may be formed integrally with the flywheel of the engine, as will be described later by reference to FIG. 5. The flywheel is indicated generally by the reference numeral 37.

Referring now in detail to FIG. 2, it should be noted that the auxiliary generator 27 is comprised of an outer housing portion 38 in which the mechanism of the electrical generator 28 is positioned. This mechanism includes a pair of brushes 39 from which electrical power may be extracted so as to supply the ignition system or other electrical components of the engine 13. Since the construction of the generator 28 per se forms no part of the invention, it has not been illustrated nor is description of it believed to be necessary. It should also be understood that although the term "generator" is employed, that the device 28 may be either a generator or an alternator. The term generator is used generically in the specification and claims to cover both types of electrical generating units.

The air compressor 29 is comprised of an outer housing 41 that is mounted beneath and affixed to the generator housing 38 although these housings may be formed from the same piece. For assembly and servicing purposes, however, it is easier to have the housings 38 and 41 be separate components.

The drive shaft 33 depends into the air compressor housing 41 and has a drive gear 42 affixed to its lower end. The drive gear 42 meshes with a driven gear 43 that is journaled on a boss formed in the housing 41 and which is affixed to a composite crankshaft 44 that carries an off center eccentric pin 45 to which the lower end of a connecting rod 46 is journaled. The connecting rod 46 drives a piston 47 that reciprocates in a cylinder sleeve 48 so as to provide a reciprocating type air compressor. An air inlet 49 admits air to the cylinder bore of the cylinder liner 48 for compression upon downward movement of the piston 47. A discharge port 51 delivers the compressed air when the piston 47 is moving upwardly to the fuel injection system and specifically to the air inlets 26 thereof. Of course, suitable check valves are provided in the inlets 49 and outlet 51 so as to prevent reverse flow.

In the described embodiment of FIGS. 1 and 2, the auxiliary generator unit 27 was mounted in the recess between the cylinder bank 16 and the air inlet pipes 22. Of course, the auxiliary generator unit 27 can be mounted on the opposite side of the engine between the cylinder bank 17 and the inlet pipes 22 as shown in the phantom line view in FIG. 1.

Figure 3:
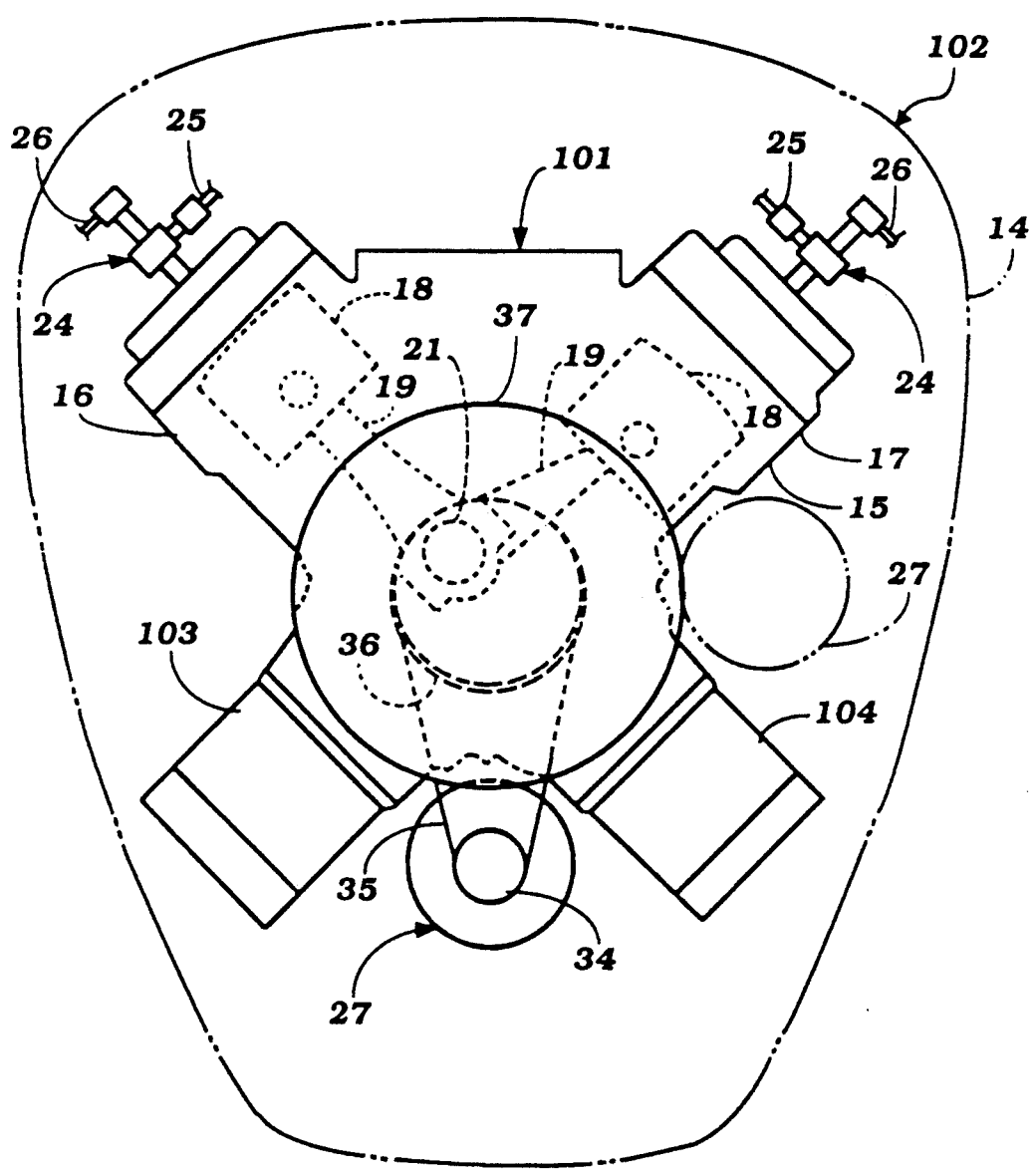
FIG. 3 is a top plan view, in part similar to FIG. 1, showing another embodiment of the invention, with portions shown in phantom.
Figure 4:
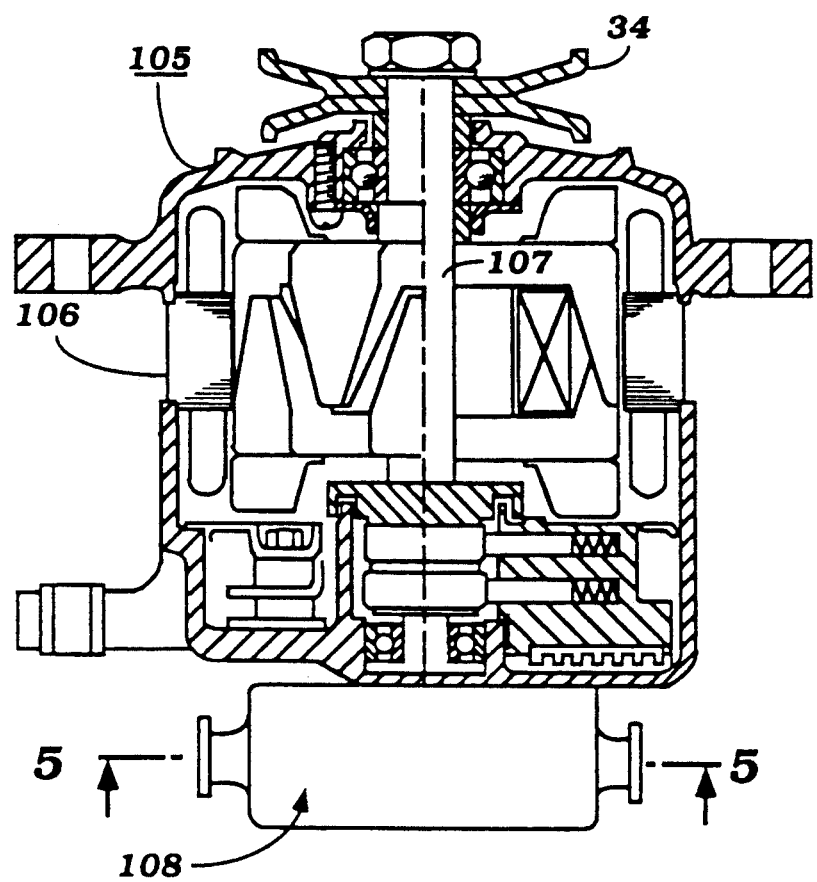
FIG. 4 is a cross-sectional view, in part similar to FIG. 2, showing another embodiment.
Figure 5:
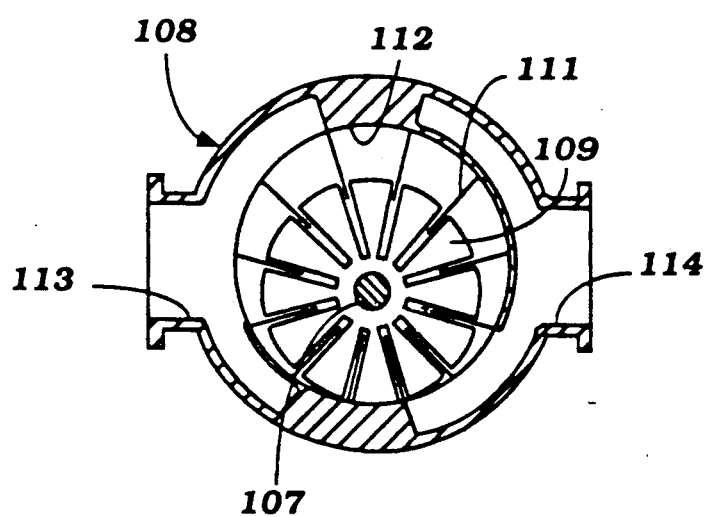
FIG. 5 is a cross-sectional view taken along the line 5—5 of FIG. 4 and shows the air compressor in cross-section.

As was aforenoted, the engine 13 in the embodiment of FIGS. 1 and 2 was of the type wherein the air inlet devices 22 are all aligned in a vertical plane and form a Y shape with the cylinder banks 16 and 17. However, the invention can also be employed in conjunction with engines wherein the inlet devices for the respective cylinder banks are aligned with the cylinder banks rather than set at an angle to them and such an embodiment is shown in FIGS. 3 through 5 wherein the engine is identified generally by the reference numeral 101. The basic configuration of the engine 101 except for its induction system is the same as the embodiment of FIGS. 1 and 2 and, for that reason, components which are the same have been identified by the same reference numerals and will not be described again, except insofar as is necessary to understand the construction and operation of this embodiment. Also, this embodiment is adapted to be embodied in a power head 102 of an outboard motor and wherein the engine is surrounded by a protective cowling 14.

In this embodiment, the induction system for the engine 101 includes a first series of air inlet pipes 103 that receive atmospheric air from a suitable air silencer and which are generally aligned with the cylinder bores of the cylinder bank 17. A second series of air inlet pipes 104 supply air to the crankcase chambers of the cylinder bank 16 and are aligned with them. Therefore, the engine assumes a generally X shape as shown in top plan and an auxiliary generator assembly 27 or the type shown in FIG. 2 may be positioned between any of the crosses of the X, for example between the inlet devices 103 and 104. The auxiliary generator 27 is driven by a pulley and sheave arrangement as described in conjunction with the embodiment of FIGS. 1 and 2 and, for that reason, further description is not believed to be required. As alternative locations for the auxiliary generator 24, it can be positioned between either of the inlet pipes 103 or 104 and the cylinder bank 17 or 16 served by the opposite inlet device. A location between the inlet pipes 104 and cylinder bank 17 is depicted in phantom in FIG. 3.

FIGS. 4 and 5 show an auxiliary generator mechanism 105 which may be used in the arrangement of either FIGS. 1 and 2 or FIG. 3. The auxiliary generator mechanism 105 includes an electrical generator 106 which may be of the same type as shown in FIG. 2 and, for that reason, further description is believed to be unnecessary. A single drive shaft 107 that is coupled to the pulley sheave 34 drives the electrical generator 106 and air compressor mechanism 108 which is of the sliding vane type as is shown in FIG. 5. The air compressor 105 includes a rotor 109 having slots in which sliding vanes 111 operate. The vanes 111 operate within a compressor cavity 112 that is offset relative to the axis of rotation of the shaft 101 so that air will be drawn through an inlet 113 pressurized and discharged to an outlet 114 for delivery to the air inlets 26 of the fuel/air injectors 24.

Figure 6:
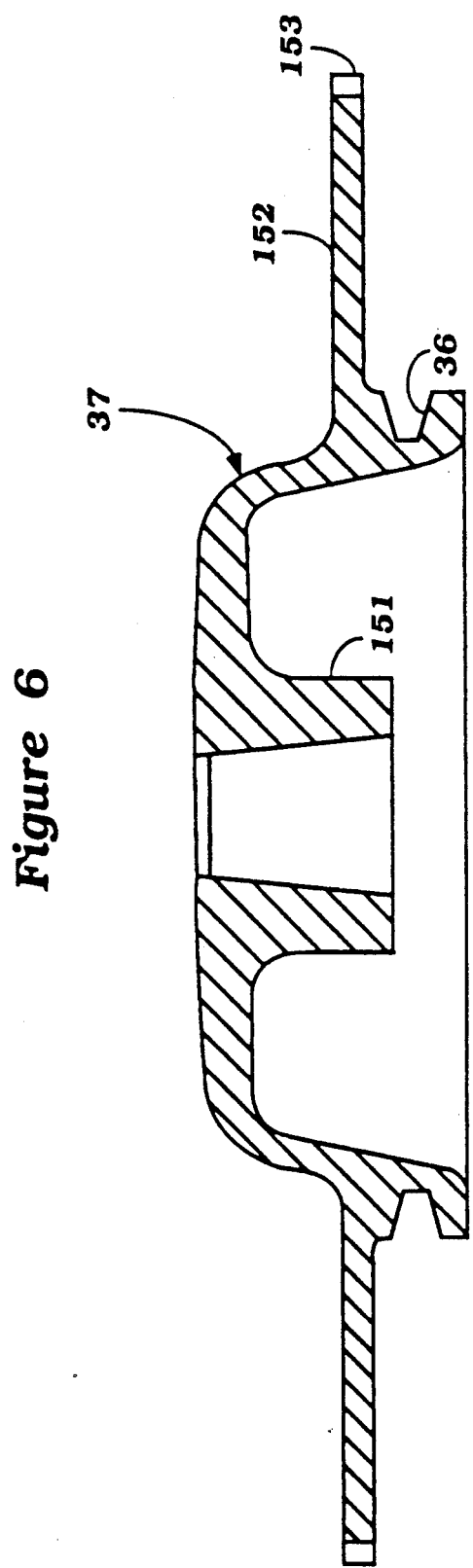
FIG. 6 is an enlarged cross-sectional view taken through a flywheel which can be constructed in accordance with an embodiment of the invention.

Referring now to FIG. 6, the construction of the flywheel 37 incorporating the integral pulley sheave 36 will be described. It should be noted that the flywheel 37 has a hub portion 151 that is adapted to be affixed to the upper end of the crankshaft 21 in a known manner. A ring gear 152 is formed above the pulley sheave 36 and has external teeth 153 that are adapted to mesh with the pinion gear of a starter (not shown) for starting of the engine 13 or 101 in a known manner.

It should be readily apparent that the combination of the air compressor and electrical generator into a single unit permits a very compact assembly that can be easily positioned within the powerhead of an outboard motor. Also, it should be noted that the construction is such that the generator and air compressor extend along the side of the engine and inwardly of the flywheel so as to further improve the compactness while still affording good serviceability. Although several embodiments of the invention have been illustrated and described, various changes and modifications may be made without departing from the spirit and scope of the invention, as defined by the appended claims.

I claim:

1. In an internal combustion engine having an output shaft driven by the expanding gases from combustion within a combustion chamber of said engine, a fuel/air injector system for injecting fuel and compressed air for combustion within said combustion chamber, the improvement comprising a generator unit having a single shaft driven by said engine output shaft and an electrical generator driven by said single shaft for generating electrical power and an air compressor driven by said single shaft for supplying pressurized air to said fuel/air injection system.

2. In an internal combustion engine as set forth in claim 1 wherein the single shaft rotates about an axis that is parallel to the axis of the engine output shaft.

3. In an internal combustion engine as set forth in claim 2 wherein the generator unit is disposed at one side of the engine.

4. In an internal combustion engine as set forth in claim 3 wherein the electrical generator and air compressor are spaced inwardly from the end of the engine from which the single shaft is driven.

5. In an internal combustion engine as set forth in claim 3 wherein the engine comprises at least one cylinder bank and one air inlet that define a valley therebetween in which the generator unit is positioned.

6. In an internal combustion engine as set forth in claim 5 wherein the electrical generator and air compressor are spaced inwardly from the end of the engine from which the single shaft is driven.

7. In an internal combustion engine as set forth in claim 2 wherein the shafts rotate about a vertically extending axes and the engine is employed in combination with an outboard motor and wherein the output shaft drives a marine propulsion device.

8. In an internal combustion engine as set forth in claim 7 wherein the generator unit is disposed at one side of the engine.

9. In an internal combustion engine as set forth in claim 8 wherein the electrical generator and air compressor are spaced inwardly from the end of the engine from which the single shaft is driven.

10. In an internal combustion engine as set forth in claim 8 wherein the engine comprises at least one cylinder bank and one air inlet that define a valley therebetween in which the generator unit is positioned.

11. In an internal combustion engine as set forth in claim 10 wherein the electrical generator and air compressor are spaced inwardly from the end of the engine from which the single shaft is driven.

12. An outboard motor comprising an internal combustion engine having an output shaft rotatable about a vertically extending axis, a fuel/air injection unit for supplying fuel and air to said engine for combustion, a protective cowling encircling said internal combustion engine, said internal combustion engine being formed with a recess at one side thereof, a generator unit having a single shaft driven by said engine output shaft and positioned within said recess, said generator unit comprising an electrical generator unit for generating electrical power and an air compressor for supplying air to said fuel/air injection unit.

13. An outboard motor as set forth in claim 12 wherein the engine has a pair of angularly disposed cylinder banks and at least one air intake device extending at an angle to one of the cylinder banks and wherein the generator unit is disposed in a recess formed between said one cylinder bank and said air intake device.

14. An outboard motor as set forth in claim 13 wherein there are a pair of angularly disposed air intake devices and the generator unit is disposed in a recess formed between one of said air intake devices and one of the cylinder banks.

15. An outboard motor as set forth in claim 13 wherein there are a pair of angularly disposed air intake devices, one serving each of the cylinder banks, and wherein the generator unit is disposed in a recess formed between the pair of air intake devices.

16. An outboard motor comprising an internal combustion engine having a pair of angularly disposed cylinder banks and an output shaft rotatable about a vertically extending axis, a protective cowling encircling said internal combustion engine, a generator unit having a single shaft driven by said engine output, said generator unit comprising an electrical generator unit for generating electrical power and an air compressor both driven by said single shaft, and at least one air intake device extending at an angle to one of said cylinder banks and wherein said generator unit is disposed in a recess formed between said one cylinder bank and said air intake device.

17. An outboard motor as set forth in claim 16 wherein there are a pair of angularly disposed air intake devices and the generator unit is disposed in a recess formed between one of said air intake devices and one of the cylinder banks.

18. An outboard motor as set forth in claim 16 wherein there are a pair of angularly disposed air intake devices, one serving each of the cylinder banks, and wherein the generator unit is disposed in a recess formed between the pair of air intake devices.

* * * * *